(12) United States Patent
Mok et al.

(10) Patent No.: US 6,975,449 B1
(45) Date of Patent: Dec. 13, 2005

(54) FAST, CONTINUOUSLY VARIABLE AUTOMATIC GAIN CONTROL FOR OPTICAL AMPLIFIERS

(75) Inventors: Franz Mok, Kanata (CA); Andy Rowland, Kanata (CA); Anant Grewal, Gloucester (CA)

(73) Assignee: Nortel Networks Limited, St. Laurent (CA)

( * ) Notice: Subject to any disclaimer, the term of this patent is extended or adjusted under 35 U.S.C. 154(b) by 323 days.

(21) Appl. No.: 10/378,637

(22) Filed: Mar. 5, 2003

(51) Int. Cl.$^7$ .............................................. H04B 10/12
(52) U.S. Cl. ................................................ 359/341.41
(58) Field of Search ................................... 359/341.41

(56) References Cited

U.S. PATENT DOCUMENTS

| | | | |
|---|---|---|---|
| 6,088,152 A * | 7/2000 | Berger et al. ................ | 359/334 |
| 6,166,850 A | 12/2000 | Roberts et al. ............. | 359/341 |
| 6,377,394 B1 * | 4/2002 | Drake et al. ........... | 359/341.41 |
| 6,377,395 B2 * | 4/2002 | Sugaya et al. ......... | 359/341.41 |
| 6,396,625 B1 * | 5/2002 | Nakaji ................... | 359/341.41 |
| 6,400,497 B1 * | 6/2002 | Suzuki et al. ........... | 359/337.11 |
| 6,407,854 B1 * | 6/2002 | Shum ..................... | 359/341.41 |
| 6,441,950 B1 * | 8/2002 | Chen et al. ................... | 359/334 |
| 6,525,873 B2 * | 2/2003 | Gerrish et al. ........... | 359/341.4 |
| 6,580,553 B2 * | 6/2003 | Kim et al. ............. | 359/341.41 |
| 6,590,700 B1 * | 7/2003 | Seydnejad et al. ....... | 359/341.4 |
| 6,690,506 B2 * | 2/2004 | Zahnley et al. ........ | 359/337.11 |
| 2002/0027706 A1 * | 3/2002 | Park et al. ............. | 359/341.41 |
| 2002/0041429 A1 * | 4/2002 | Sugaya et al. .............. | 359/334 |
| 2003/0011880 A1 * | 1/2003 | Kim et al. ............. | 359/341.41 |
| 2003/0030894 A1 * | 2/2003 | Stentz ................... | 359/341.41 |
| 2004/0240044 A1 * | 12/2004 | Park et al. ............. | 359/341.41 |

* cited by examiner

*Primary Examiner*—Jack Keith
*Assistant Examiner*—Eric Bolda
(74) *Attorney, Agent, or Firm*—Max R. Wood; Ogilvy Renault LLP (57) ABSTRACT

Provided by the invention is a fast, continuously variable AGC that can be used to control the gain of an optical amplifier. The AGC is designed around a controller having control coefficients that may be dynamically adjusted according to operating conditions. According to an embodiment of the invention provided is an AGC that can operate at much higher speeds in comparison with prior art AGC designs that have fixed control coefficients, while simultaneously maintaining stability over all operating conditions.

24 Claims, 7 Drawing Sheets

FAST, CONTINUOUSLY VARIABLE AUTOMATIC GAIN CONTROL FOR OPTICAL AMPLIFIERS

FIELD OF THE INVENTION

This invention relates generally to optical communications and more specifically to apparatus and methods used in optical communications.

BACKGROUND

In Dense Wavelength Division Multiplexed (DWDM) optical communication systems an optical signal, having a total optical power, is actually a composite optical signal made up of multiple carrier wavelengths. Each wavelength is typically used to define an optical channel on which information can be transported. Thus, at any given instant the total optical power of a DWDM optical signal is the summation of the optical power over all the wavelengths that make up the DWDM optical signal.

Optical amplifiers are used to boost the power of signals travelling along an optical fiber. When operated under fixed pump current drive conditions, an optical amplifier output power is constant and for the most part independent of input power levels. For this reason, when amplifiers that carry a number of wavelengths have wavelengths dropped at their input, surviving channels see an increase in power due to the power transferred from the dropped wavelengths. Similarly when wavelengths are added at the input, the total power that was originally distributed over the wavelengths present beforehand, must be redistributed across a larger number of wavelengths, causing the originally present wavelengths to undergo a reduction in power. Power reductions of that nature can cause bit errors to occur at receivers, while power increases can cause not only bit errors but also physical damage to receivers. Power changes due to wavelengths being added or dropped are typically referred to as transients.

By effectively controlling the gain of an optical amplifier, transients can be effectively controlled when wavelengths are added and dropped. A gain control mechanism for an optical amplifier is commonly referred to as an Automatic Gain Controller (AGC).

An AGC in combination with an optical amplifier creates a constant total power gain or ratio of total output power over total input power, regardless of the input power level and wavelength composition of the optical amplifier input. The pump current drive conditions of the optical amplifier are controlled by the AGC to achieve a constant total power gain target.

An optical amplifier alone or in combination with an AGC does not typically account for the fact that a DWDM optical signal is made up of a number of constituent optical wavelengths. A DWDM optical signal input to the optical amplifier is simply treated as a whole having a total optical power that will be boosted accordingly. That is, in some instances when an optical amplifier is operated under fixed pump current drive conditions, all of the powers for the individual outputted wavelengths sum to a fixed total power level regardless of the number of wavelengths. In the event of a switching event, fiber disconnect or equipment failure, where one or more wavelengths is added to or dropped from an optical amplifier input, the AGC must adjust the pump current value(s) such that the ratio of total output power over total input power is substantially constant.

However, the pump current drive adjustment from the AGC is typically much slower than the time taken for the surviving channels to experience a power change. The speed of an AGC is typically limited by stability problems since an AGC must be slow enough to maintain stability over a wide range of operating conditions.

Consequently, the wavelengths then outputted by the optical amplifier (after an abrupt change in the input DWDM optical signal) experience fast transient power excursions that can be harmful to the equipment of the optical system and data carried on it. Specifically, the powers excursions can cause high bit error rates (BER's) when wavelengths are abruptly added to the input stream and damage to receivers and/or high BER's when wavelengths are abruptly dropped from the input stream. The transients, although large in magnitude, are extremely fast (having time constants in the range of tens of microseconds to milliseconds); thus, they are difficult for conventional AGC implementations to control. The net effect has been that while wavelengths outputted from optical amplifier will eventually be forced back to their initial (target) power level in steady state by pump current drive adjustment from the AGC, they will undergo significant power excursions during abrupt switching events.

Exotic AGC designs incorporate a feed-forward path that influences the pump current drive provided by the AGC based on changes in the input power. While this greatly improves the AGC speed, low frequency data content in the measured input power can cause false triggering of the AGC, leading to undesired controller behaviour (e.g. instability and error injection) during steady state conditions when the pump current drive provided by the AGC output should remain fixed. That is, the AGC control (pump current drive) current fluctuates erratically in response to minor fluctuations of the input wavelength powers resulting in a deteriorated level of control over the total optical output power level of the optical amplifier.

SUMMARY OF THE INVENTION

According to an aspect of the invention provided is an Automatic Gain Controller (AGC) for controlling a gain of an optical amplifier. The AGC has a controller having at least one control coefficient that can be dynamically adjusted, the controller connectable to the optical amplifier to provide the optical amplifier with a bias condition that controls the gain provided by the optical amplifier; an output power monitor connectable to the optical amplifier for taking at least one output power measurement from the optical amplifier; and a dynamic control block that dynamically adjusts the at least one of the control coefficient of the controller in relation to the at least one output power measurement.

In some embodiments the controller further controls the gain of the optical amplifier by taking into consideration an average output power measurement of the outputted power of the optical amplifier.

In some embodiments the AGC has an input power monitor connectable to the optical amplifier for taking at least one input power measurement from the optical amplifier; a multiplier for combining the at least one input power measurement with a gain target to produce a target output power; a subtractor for generating an error signal by taking a difference of the target output power and the at least one output power measurement; and wherein the difference is coupled into the controller.

According to another aspect of the invention provided is an Automatic Gain Controller (AGC) for controlling a gain of an optical amplifier. The AGC has a Proportional-Integral (PI) controller, having proportional and integral control coefficients $K_p$ and $K_i$ respectively, that can be dynamically adjusted, the PI controller connectable to the optical amplifier to provide the optical amplifier with a bias condition that controls the gain provided by the optical amplifier; an output power monitor connectable to the optical amplifier for taking at least one output power measurement from the optical amplifier; and a dynamic control block that dynamically adjusts at least one of the proportional and integral control coefficients $K_p$ and $K_i$ in relation to the at least one output power measurement.

In some embodiments the AGC has an input power monitor connectable to the optical amplifier for taking at least one input power measurement from the optical amplifier; a multiplier for combining the at least one input power measurement with a gain target to produce a target output power; a subtractor for generating an error signal by taking a difference of the target output power and the at least one output power measurement; and wherein the difference is coupled into the PI controller.

In some embodiments the dynamic control block adjusts $K_p$ according to $K_p = K_i \times \tau_p$, where $\tau_p$ is the time constant of a dominant pole in a transfer function of the PI controller; where in some embodiments $\tau_p$ is approximately related to the measured output power by a function specific to the optical amplifier.

According to yet another aspect of the invention there is provided a method of controlling an optical amplifier. The method involves: i) Measuring input and output power levels with respective input and output power monitors to obtain at least one input power measurement and at least one output power measurement; ii) Multiplying the at least one input power measurement by a gain target to produce a target output power; iii) Subtracting the at least one output power measurement from the target output power to produce an error signal; and iv) Applying the error signal to a controller, which in turn drives the optical amplifier.

Moreover, the controller, in some embodiments of the method, is a PI controller having a proportional coefficient $K_p$ that is continuously updated according to output power measurements such that $K_p$ is adjusted to substantially cancel a varying cut-off frequency of the optical amplifier. Additionally, the optical amplifier is nominally controlled by the AGC to provide an output signal with a tilted spectrum that is useful in combating Stimulated Raman Scattering (SRS) based transients.

Another aspect of the invention provides the use of a tilted optical amplifier spectrum to combat SRS based transients.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

In order to limit the effect of fast transient power excursions that are induced in an optical signal caused by abrupt changes in the composition of the optical signal an apparatus and method are provided by the invention to quickly control the total power gain provided by an optical amplifier. Furthermore, in an enhanced adaptation of the invention the apparatus and method provided can be employed to compensate for Stimulated Raman Scattering (SRS) and SRS-based transients in optical signals.

Figure 1A:
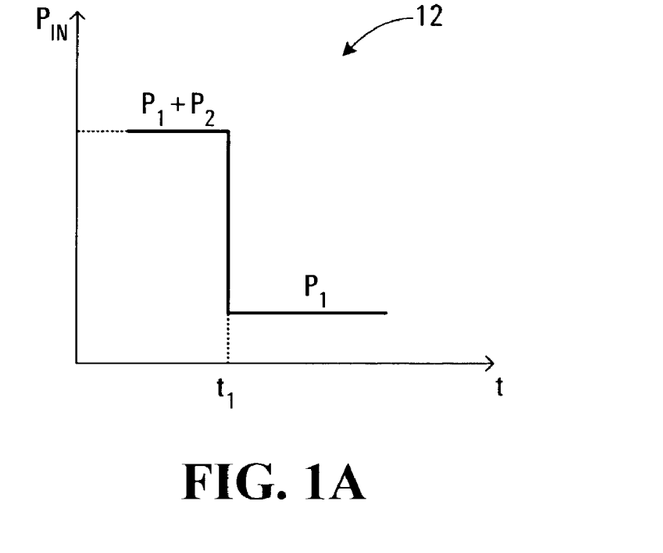
FIG. 1A is a Power vs. Time plot of a switching event in which a wavelength is dropped from a Dense Wavelength Division Multiplexing (DWDM) optical signal arriving at an input of an optical amplifier that is used in combination with a prior art Automatic Gain Controller (AGC)

Referring to FIG. 1A, shown is a Power vs. Time plot, generally indicated by 12, of an example switching event in which a wavelength is dropped from a Dense Wavelength Division Multiplexing (DWDM) optical signal. The DWDM optical signal shown in FIG. 1A is represented by its total optical power and is input to an optical amplifier (not shown) that is used in combination with a prior art Automatic Gain Controller (AGC) (also not shown). The initial total optical power of the DWDM optical signal is made up of the summation of optical powers $P_1$ and $P_2$ in respective wavelengths (not shown) $\lambda_2$ and $\lambda_2$. At a switching time (instant) $t_1$ wavelength $\lambda_2$ is dropped from the DWDM optical signal, thus the total optical power of the DWDM optical signal abruptly drops from $(P_1+P_2)$ to $P_1$.

Figure 1B:
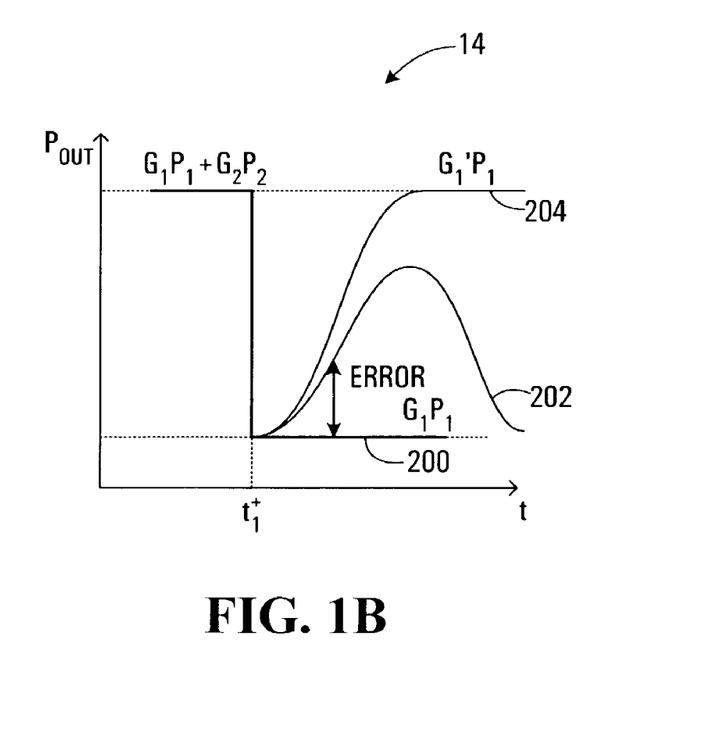
FIG. 1B is a Power vs. Time plot of a resulting transient response, induced by the switching event of FIG. 1A, in a corresponding output DWDM optical signal.

Shown in FIG. 1B is another Power vs. Time plot, generally indicated by 14, of a corresponding transient response (to the switching event shown in FIG. 1A) in a corresponding DWDM optical signal outputted by the optical amplifier. Before the switching time $t_1$ the total optical output power of the optical amplifier is held steady at $(G_1P_1+G_2P_2)$. The terms $G_1$ and $G_2$ are power gains provided by the optical amplifier to each of the wavelengths $\lambda_1$ and $\lambda_2$ respectively. The total power gains $G_1$ and $G_2$ are held substantially constant by way of the pump current drive provided by the prior art AGC.

Immediately after the switching time $t_1$, at $t_1^+$, the total optical output power outputted by the optical amplifier correctly drops to $G_1P_1$, which is generally indicated by 200. However, the total optical output power will tend towards $G_1'P_1$, which is generally indicated by 204, unless the AGC can adjust the pump currents quickly enough. The term $G_1'$ is the total power gain provided to the first wavelength $\lambda_1$ that would cause the total output power outputted by the optical amplifier to be the same as $(G_1P_1+G_2P_2)$. Thus, in other words, the outputted power on wavelength $\lambda_1$ will become much higher than it was intended to be.

Since the prior art AGC is not fast enough to change the pump current drive conditions appropriately, the total amplifier output power level will tend to increase back to the original power level (to what it was before the switching event) until the AGC can reduce the pump current drive. As a result, the optical amplifier will deliver a temporary overall gain increase on surviving wavelengths, and specifically the surviving wavelength $\lambda_1$ will see a corresponding power increase, which is generally indicated on 202. However, as generally indicated on 202, once the AGC adjusts to a new correct pump current drive corresponding to the state of the total optical input power the AGC will operate to pull the powers of the remaining wavelengths back down. The problem is that the transient described occurs extremely fast and the surviving wavelength(s) (e.g. $\lambda_1$) may reach levels where they may potentially cause bit errors or even damage to a respective optical receiver front end before they are brought back down to the correct power level. This problem is compounded if there are multiple amplifiers cascaded along the optical fiber en route to the receiver, as the total optical power of wavelength $\lambda_1$ may rise to dangerously high levels.

A related transient response problem occurs when a wavelength is abruptly added to a DWDM optical signal. For example, shown in FIGS. 2A and 2B are respective input and output Power vs. Time plots, generally indicated by 16 and 18 respectively, showing another example switching event in which a wavelength is added and a corresponding induced transient response in an outputted DWDM optical signal.

Figure 2A:
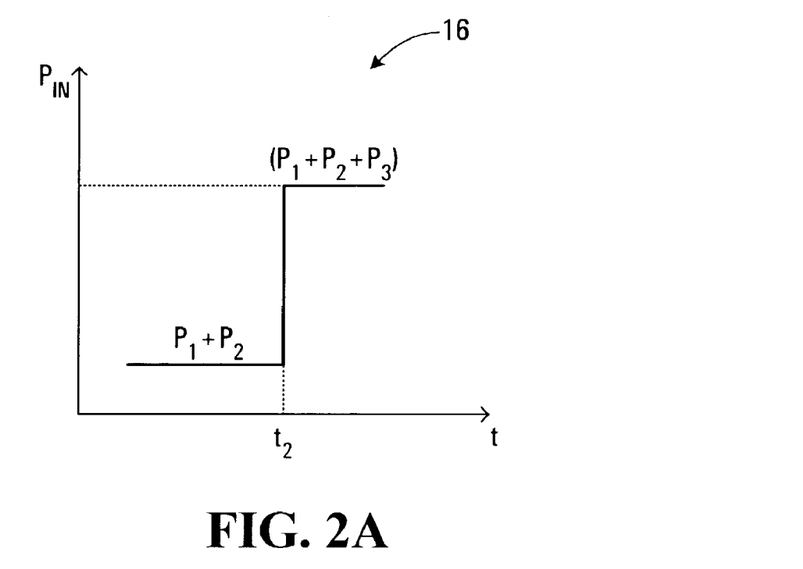
FIG. 2A is a Power vs. Time plot of a switching event in which a wavelength is added to a DWDM optical signal arriving at the input of the optical amplifier that is used in combination with the prior art AGC.

Referring to FIG. 2A, a DWDM optical signal (to be input to the optical amplifier and prior art AGC introduced above) is initially made up of two wavelengths $\lambda_1$ and $\lambda_2$ having respective powers $P_1$ and $P_2$. At a switching instant $t_2$ a third wavelength $\lambda_3$ having a respective power $P_3$ is added to the input DWDM optical signal raising the total input optical power to the summation of $P_1$, $P_2$ and $P_3$.

Figure 2B:
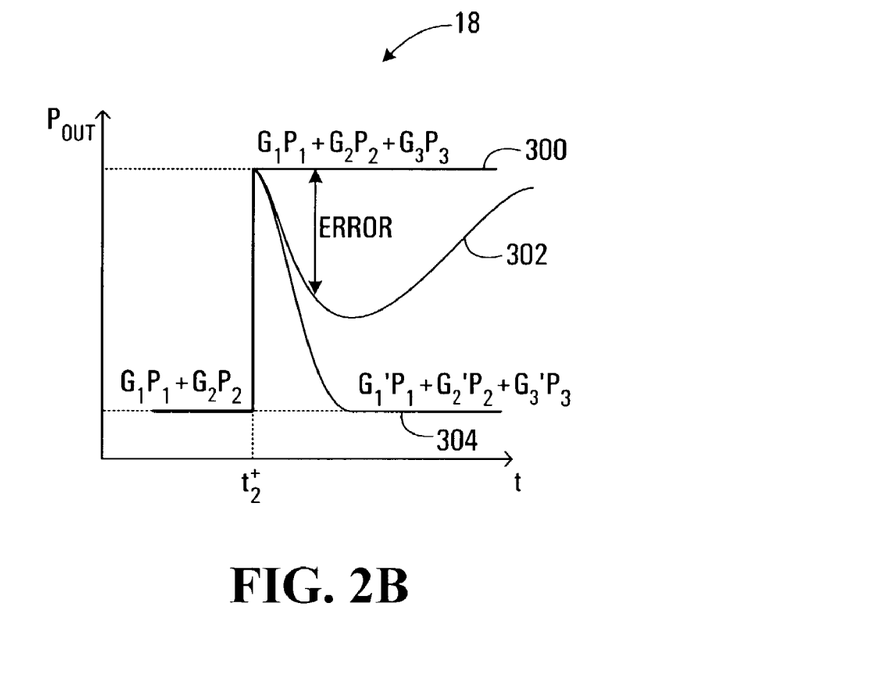
FIG. 2B is a Power vs. Time plot of a resulting transient response, induced by the switching event of FIG. 2A, in a corresponding output DWDM optical signal.

With further reference to FIG. 2B the initial (before the switching instant $t_2$) total optical output power is $(G_1P_1+G_2P_2)$. Immediately after the switching instant $t_2$, at $t_2^+$, the total optical output power outputted from the optical amplifier correctly rises to $(G_1P_1+G_2P_2+G_3P_3)$ as generally indicated by 300. However, since the prior art AGC simply can not change the pump current drive fast enough, the subsequent total output power drops towards the level it was at prior to the switching event (i.e. $G_1'P_1+G_2'P_2+G_3'P_3 \cong G_1P_1+G_2P_2$), which is generally indicated by 304. As a result, the optical amplifier will deliver a temporary overall gain decrease for each of the wavelengths $\lambda_1$, $\lambda_2$ and $\lambda_3$, which in turn could cause bit errors at the receiver.

Consequently, all the wavelengths (old and new) present in the outputted DWDM signal experience an a temporary decrease in their respective powers, indicated generally by 302, since the added wavelength $\lambda_3$ now takes up some of the total optical output power delivered before the switching instant. Once the AGC adjusts to a new pump current drive, it will act to pull up the respective powers of all the wavelengths, as generally indicated on 302. Again the problem is that the transient described occurs extremely fast, and the surviving wavelengths will experience power drops that may cause bit errors at the optical receiver, before they are brought back to their previous respective (intended) power levels.

It should be noted that in both the examples given above that the prior art AGC does not adjust pump current drive for the gain on each of the wavelengths. It adjusts the gain provided to each of the wavelengths by driving the optical amplifier to deliver a gain spectrum in which the gain at a given wavelength is dependent on the wavelength. It some instances the gain provided to all wavelengths may be substantially equal (i.e. $G_1 \cong G_2 \cong \ldots G_n \cong G$), whereas in other instances the gain spectrum can be some function with respective to the wavelengths in the band of interest.

The transient response problems discussed thus far are compounded by transmission fiber based Stimulated Raman Scattering (SRS). Transmission fiber based SRS is a form of dynamic channel distortion in which the optical signal spectrum of transmitted frequencies is distorted as the optical signal travels through an optical fiber. The distortion results in a power skew from the shorter wavelengths to the longer wavelengths transmitted through the optical fiber. In actuality it is energy that is transferred from shorter wavelengths to longer wavelengths via SRS. Transmission fiber based SRS is a function of the number of wavelengths transmitted, the respective powers of each of the transmitted wavelengths, the length of the transmission fiber and the fiber type.

Figure 3:
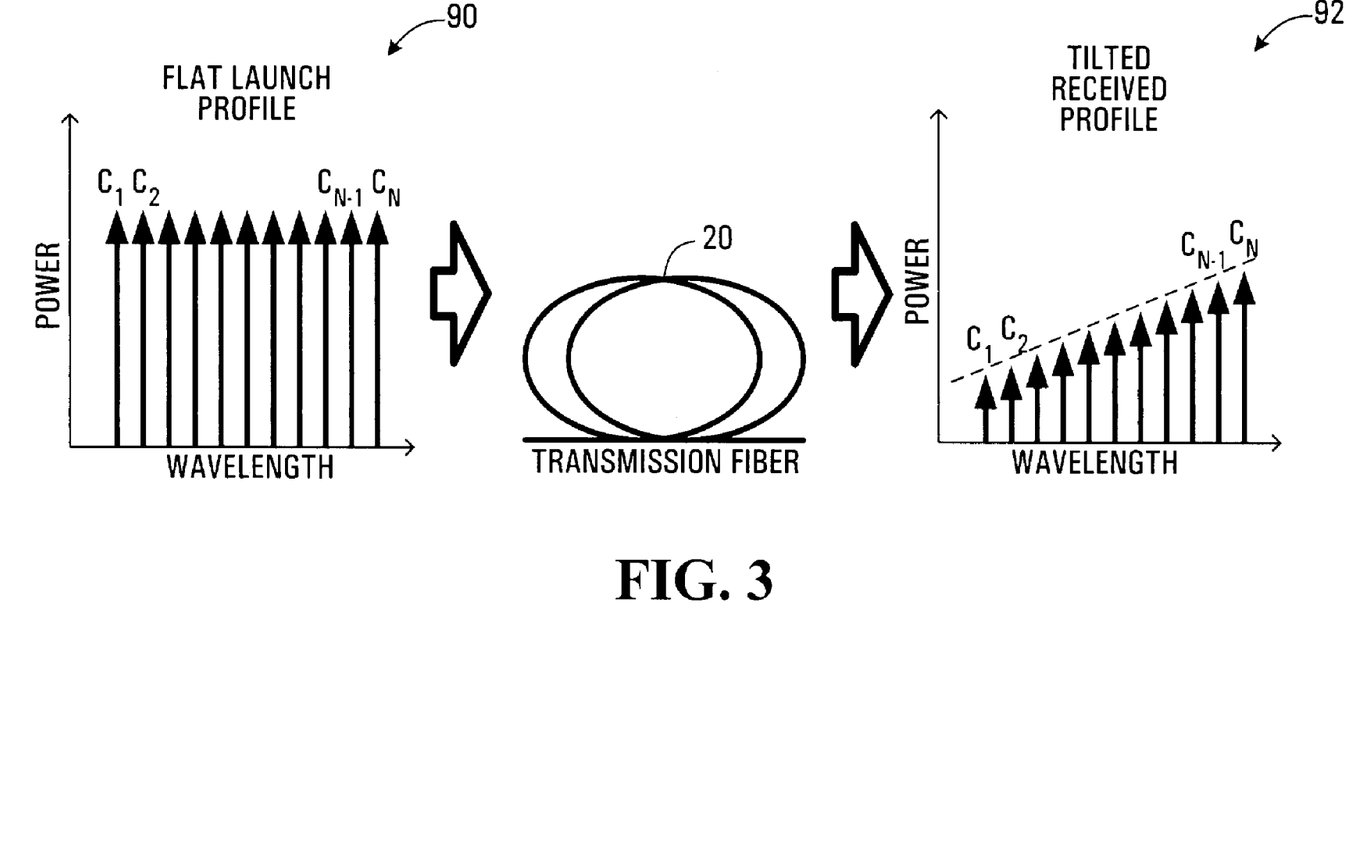
FIG. 3 is an illustration showing the effect of Stimulated Raman Scattering (SRS) on a DWDM optical signal.

Provided as an illustrative example, FIG. 3 shows the effect of transmission fiber based SRS on a DWDM optical signal transmitted with a flat launch profile. Specifically, shown is a spectrum of a DWDM optical signal, indicated generally at 90, having a flat launch profile that is transmitted into an optical fiber 20. Received from the optical fiber 20 is a corresponding received DWDM optical signal, indicated generally by 92, having a tilted profile. In the wavelength (carrier frequency) domain the tilt is approximately linear on a decibel (dB) scale. With reference to both the transmitted and received spectrums 90 and 92 channel (i.e. wavelength) $C_1$ is the shortest wavelength to be transmitted/received and accordingly there are no wavelengths below it that can transfer energy to it. By contrast, channel $C_N$ has N−1 channels below it and is therefore "pumped" by N−1 wavelengths. That is, energy from the N−1 channels below channel $C_N$ transfers energy to channel $C_N$.

Optical amplifiers operating in steady state can be controlled to help equalize (redistribute) channel powers to compensate for transmission fiber based SRS, improving the reach of a span (in terms of distance). In order to compensate for SRS optical amplifiers can be operated to output the constituent wavelengths of a DWDM optical signal with a tilted launch profile opposite to the tilt that would be induced by the optical fiber. In practice that means that if channel $C_1$ is launched respecting some peak power limit, then all the other channels will be launched at lower powers reducing the overall SRS. This also means that the gain spectrum provided by the optical amplifier is one in which the gain provided at any one wavelength is somewhat different than the gain provided at adjacent wavelengths, where the difference can be derived from the slope of the gain spectrum.

Erbium Doped Fiber Amplifiers (EDFA's) are particularly useful for this end. EDFA's can be controlled relatively easily (by an AGC) to deliver a launch profile that has approximately the opposite of the tilt induced by SRS in an optical fiber across the transmitted spectrum of wavelengths without having to individually control the gain for each wavelength. In other words EDFA's can be operated away from the typical Design Flat Gain (DFG) to generate the desired tilted spectra by virtue of the EDFA's Dynamic Gain Tilt (DGT) properties. The tilted spectrum provided by an EDFA is only approximately linear, and will depend on a particular EDFA's absorption and emission cross-sections.

Based only on the absorption and emission cross-sections, a Gain Tilt Expression (1) given below can be used to predict the change in gain at all wavelengths when the gain at an arbitrary reference wavelength changes. Accordingly, the terms $\Delta G(\lambda)$ and $\Delta G(\lambda_{ref})$ denote the change in gain at a wavelength $\lambda$ and the change in gain at another wavelength $\lambda_{ref}$ respectively. These quantities can be computed by calculating or measuring the emission cross-section $\sigma_{ems}$ and absorption cross-section $\sigma_{abs}$ at the respective wavelengths $\lambda$ and $\lambda_{ref}$. The emission cross-section $\sigma_{ems}$ and absorption cross-section $C_{abs}$ are properties of an EDFA. It would be appreciated by those skilled in the art that other types of optical amplifiers would have similar properties and the gain tilt provided by other types of optical amplifiers could be predicted using similar expressions to that of the Gain Tilt Expression (1).

$$\text{Tilt}(\lambda) - \frac{\Delta G(\lambda)}{\Delta G(\lambda_{ref})} = \frac{\sigma_{ems}(\lambda) + \sigma_{abs}(\lambda)}{\sigma_{ems}(\lambda ref) + \sigma_{abs}(\lambda ref)}$$

Figure 4:
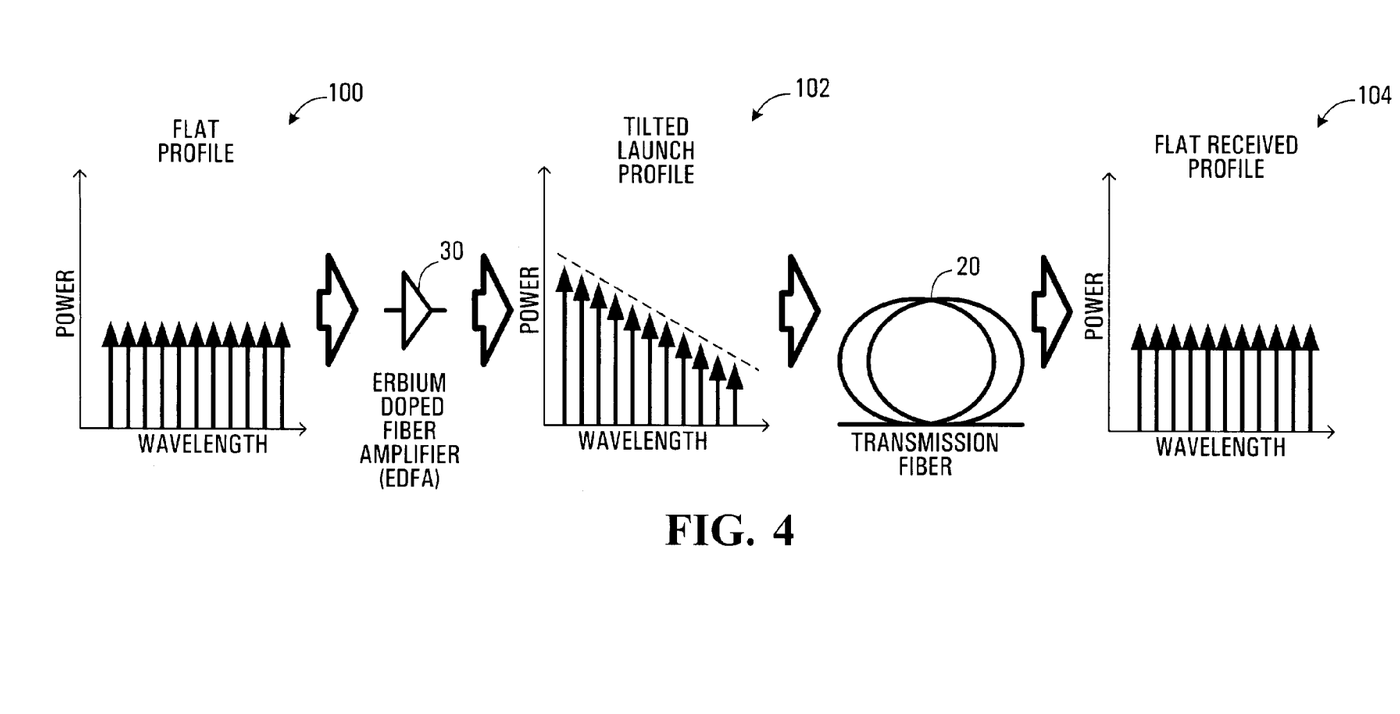
FIG. 4 is an illustration showing a DWDM optical signal spectrum at various points in a DWDM communication system that has been designed to compensate for SRS.

Provided as another illustrative example, shown in FIG. 4 is a DWDM optical signal spectrum at various points in a DWDM communication system that has been designed to compensate for SRS using an EDFA's DGT properties. Specifically, a DWDM optical signal, indicated generally by 100, having a flat profile is delivered to an EDFA 30 that is controlled to convert the DWDM optical signal 100 having a flat profile into a corresponding DWDM optical signal, indicated generally by 102, having a tilted launch profile. The DWDM optical signal 102 having the titled launch profile is then transmitted into an optical fiber 20. Within the optical fiber 20 the DWDM signal experiences the effect of transmission fiber based SRS. However, since the DWDM optical signal was transmitted with a tilted launch profile controlled to be opposite to that of the SRS effect from the optical fiber 20, the DWDM optical signal, indicated generally by 104, arriving at a receiver will have a substantially flat profile. It should be noted that the flat received DWDM optical signal 104 will not be perfectly flat; however, the compensation provided if approximated to a first order can be considered flat.

As illustrated in FIG. 4 an EDFA's DGT properties can be useful in reducing the effects of transmission fiber based SRS in steady state. However, the transient problems remain and in fact they get worse. First, SRS based transients are extremely fast having time constants for their rise and fall times which are on the order of a few femto-seconds ($\tau_{tr} \cong 3$ fs$=3 \times 10^{-15}$ sec) making them extremely difficult to combat. Second, the additional complication of driving an EDFA (or other optical amplifier) via an AGC to provide DGT further slows the overall response of the control system allowing already fast transients time to rise to potentially dangerously higher levels.

Moreover, the effect of SRS based transients is compounded on links with multiple spans having multiple cascaded optical amplifiers. That is, a transient power excursion created by one optical amplifier is intensified by the gain provided by optical amplifiers cascaded on a link after the optical amplifier that originated it. For example, on an optical link having M+1 spans, a transient originating in the first optical amplifier would experience an M−1 fold increase in gain by the time it reached a receiver.

The invention provides a fast, continuously variable AGC that can be used to control the gain of an optical amplifier. The AGC is built around a Proportional Integral (PI) controller having proportional and integral control coefficients that are dynamically adjusted according to operating conditions. Such an implementation provides AGC that can operate at much higher speeds in comparison with prior art AGC designs- that have fixed parameters; while maintaining stability over all operating conditions. An optical communication system incorporating optical amplifiers controlled by the fast, continuously variable AGC provided by the invention will be more resilient to transient power excursions and switching events.

Figure 5:
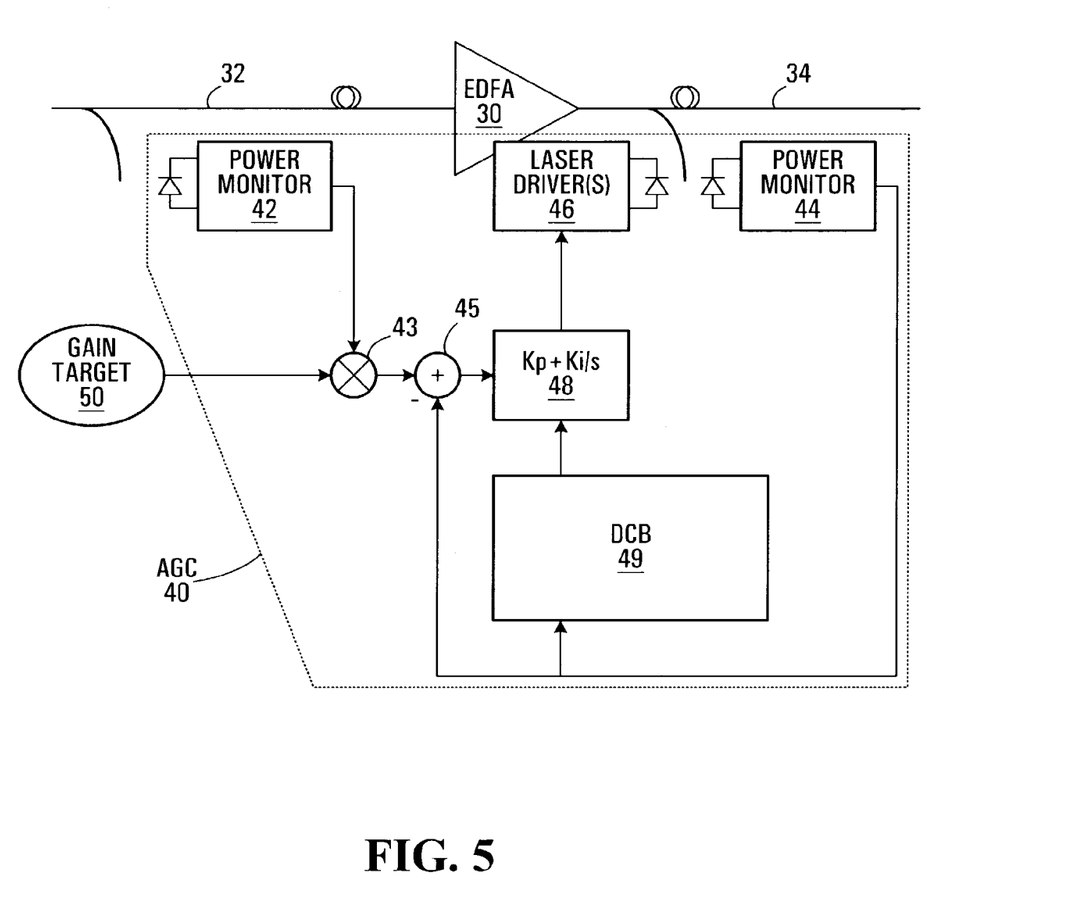
FIG. 5 is a schematic view of an optical amplifier in combination with an embodiment of an AGC provided by the invention.

Shown in FIG. 5 is a schematic view of an EDFA 30 in combination with a preferred embodiment of an Automatic Gain Controller (AGC) 40 according to the invention. It would be appreciated by those skilled in the art that the EDFA 30 and the AGC 40 are supported by an additional combination of hardware, software and firmware; however the following description includes only those elements necessary to disclose the invention.

The EDFA 30 has a fiber input 32 and a fiber output 34. The AGC 40 is comprised of input and output power monitors 42 and 44 respectively. The input and output power monitors 42 and 44 are coupled to measure optical signal powers on the fiber input 32 and fiber output 34 of the EDFA 30. The input power monitor 42 is coupled to deliver an input power measurement to a multiplier 43, which also receives a gain target 50 from an outside source (not shown). The multiplier 43 is itself coupled to deliver its output (the details of which will be discussed in regard to the operation of the AGC 40) to a subtractor 45, which also receives an output power measurement from the output power monitor 44. The output of the subtractor 45 is then coupled into a PT controller 48 which is itself adjusted by a Dynamic Control Block (DCB) 49. The DCB 49 delivers updated versions of a proportional control coefficient $K_p$ for the PI controller 48 based on the same output power measurement provided by the output power monitor 44. In turn, the PI controller 48 provides a pump drive voltage to laser driver(s) 46, which are coupled to deliver a pump current to the lasers of the EDFA 30. Accordingly, the laser driver(s) 46 are in practice typically voltage to current converters.

In alternative embodiments the lasers driver(s) 46 and EDFA 30 are arranged in a module to which the rest of the AGC 40 can be connected. That is, in some embodiments the laser driver(s) 46 are integrated into the EDFA 30 or a module that comprises the EDFA 30. Clearly then the laser driver(s) 46 would not be required in the design of the AGC 40, since the AGC 40 would simply provide the pump driver voltage from the PI controller 48 to the EDFA 30. More generally, other components of the AGC 40 could be integrated together in a similar manner without departing from the scope or spirit of the invention.

The gain control function of the AGC 40 shown in FIG. 5 is provided by the PI controller 48 and it is designed around the EDFA 30 pump-to-output power transfer function and the laser driver(s) 46 transfer function. The EDFA 30 pump-to-output power transfer function may be characterized by a first order low-pass filter having a time constant $\tau_p$. In the present embodiment the time constant $\tau_p$ is assumed to vary with output power according to approximate characteristic expressions (2) and (3) given below.

$$P_{out} = \frac{G_p}{1 + \tau_p s} I_{pump} \quad (2)$$

$$\tau_p = \frac{\tau_f}{1 + \frac{P_{out}}{P_{IS}}} \quad (3)$$

It should be noted that expressions (2) and (3) are specific to the present embodiment of the invention and that the time constant $\tau_p$ would generally be a function of the output power of a given type of optical amplifier in a way specific to the type of optical amplifier. Moreover, the AGC 40 could also be used in the same manner for more general cases where $\tau_p$ is any known function of operating conditions.

Referring to expression (2) and with further reference to FIG. 5, $P_{out}$ is the total optical output power delivered by the EDFA 30 and $G_p$ is the total pump-to-output power gain provided by the combination of the EDFA 30 being driven by the laser driver(s) 46. The pump current supplied by the laser driver(s) 46 is denoted by $I_{pump}$ and s is the Laplace complex variable (i.e. s=σ+jω).

The time constant $\tau_p$ for the low-pass filter transfer function of expression (2) is defined in expression (3) as a function of the sampled output power and the physical characteristics of an EDFA. The term $\tau_f$ is referred to as the fluorescence time of an EDFA and in this particular embodiment it has a characteristic time (value) of approximately 10 ms (ten milli-seconds). Similar to $\tau_p$, $\tau_f$ could be different for other types of optical amplifiers. The time constant $\tau_p$ is also dependent on $P_{IS}$ which denotes the intrinsic saturation power constant for a particular EDFA.

In order to make the PI controller 48 run fast while maintaining stability, coefficients $K_p$ and $K_i$ denoting the proportional and integral characteristics of the PI controller 48 are dynamically adjusted to track a particular value of $\tau_p$ for a given optical output power level. That is, for the PI controller 48 having a transfer function that is given by $K_p + K_i/s$, $K_p$ is chosen such that $$\frac{K_p}{K_i} = \tau_p$$

($K_i$ is a constant). Consequently, the performance of the PI controller 48 and in general the operating characteristics of the AGC 40 are made independent of the operating conditions, as the varying dominant pole (recognized by $\tau_p$) from the pump to output power transfer function (not shown) will be cancelled. Thus, the AGC 40 can be driven as fast as possible at any given operating point while still maintaining stability at all operating points.

In the present embodiment of the invention the integral coefficient $K_i$ in the transfer function of the PI controller 48 is held constant, while the proportional coefficient $K_p$ is dynamically adjusted in response to output power $P_{out}$ measurements. The output power $P_{out}$ measurements are related to $K_p$ by expression (3) and the above noted constraint of $$\frac{K_p}{K_i} = \tau_p$$

(or equivalently $K_p = \tau_p \times K_i$). The result is that a term in the transfer function of the PI controller 48 cancels the varying dominant pole (recognized by $\tau_p$) of the pump to output power transfer function. This normalizes the operating characteristics of the AGC 40 over its operating range, which thereby allows the AGC 40 the to be driven as fast as possible at any given operating point.

Beneficially, the invention as shown in FIG. 5 helps to equalise the channel powers, improving system reach in terms of distance. An additional benefit of using this type of equalization/control is the transient performance. Specifically, the invention provides a fast AGC 40 with stable control to approximately compensate for the SRS based transient with a fast anti-transient.

Moreover, the invention as shown in FIG. 5 can be used to effectively counter the effect of transmission fiber-based SRS and resulting SRS-based transients by having the AGC 40 work to maintain an average output power $P_a$ across a band of transmitted wavelengths in relation to the total gain. The total gain is defined by the total output power divided by the total input power. It was noted above that an EDFA can be easily dynamically driven to provide a tilted output by varying the amount of over-pumping provided to it. Thus, by making the over-pumping condition the nominal operating condition for the EDFA 30 in combination with the AGC 40 a tilted spectrum will be inherently produced without further modification to the invention as shown in FIG. 5. Accordingly, the AGC 40 works to maintain the average output power $P_a$ across a band of transmitted wavelengths while at the same time maintaining a DGT based slope induced in the EDFA 30 output through a "Gain Offset" and total gain defined by the total output power divided by the total input power.

In operation, the AGC 40 using the fast, continuously variable PI controller 48 controls the average power $P_a$ (across the band of transmitted wavelengths) and the DGT properties of the EDFA 30 as follows. First the EDFA 30 input and output (average) power levels are measured by power monitors 42 and 44 respectively. Second, the measured input power provided by the input power monitor 42 is multiplied by the gain target 50 (using the multiplier 43). This operation provides an (average) equivalent target optical output power that is outputted from the multiplier 43 and coupled into the subtractor 45. Third, the measured output power $P_{out}$ is subtracted from the equivalent target optical output power in order to derive an error signal. Fourth, the error signal is applied to the PI controller 48. Finally, the output (i.e. the pump current $I_{pump}$) of the PI controller 48 is delivered to the laser driver(s) 46 to achieve the desired (average) output power.

All the while the coefficient $K_p$ of the PI controller 48 is continuously updated according to the measured (average) output power $P_{out}$. The value of $K_p$ chosen at any given time is done to substantially cancel the varying cut-off frequency of the pump to output power transfer function. In other words, $K_p$ is updated by the DCB 49 such that the aforementioned term in the PI controller 48 transfer function cancels the dominant pole (recognized by $\tau_p$) of the pump-to-output power transfer function. As shown in FIG. 5, the value of $K_p$ may be derived from expressions (2) and (3) provided above or from a look-up table that is indexed by output power values. In either case, the overall effect is that for all operating conditions, the AGC 40 is always operating as fast as possible while maintaining stability.

Figure 6A:
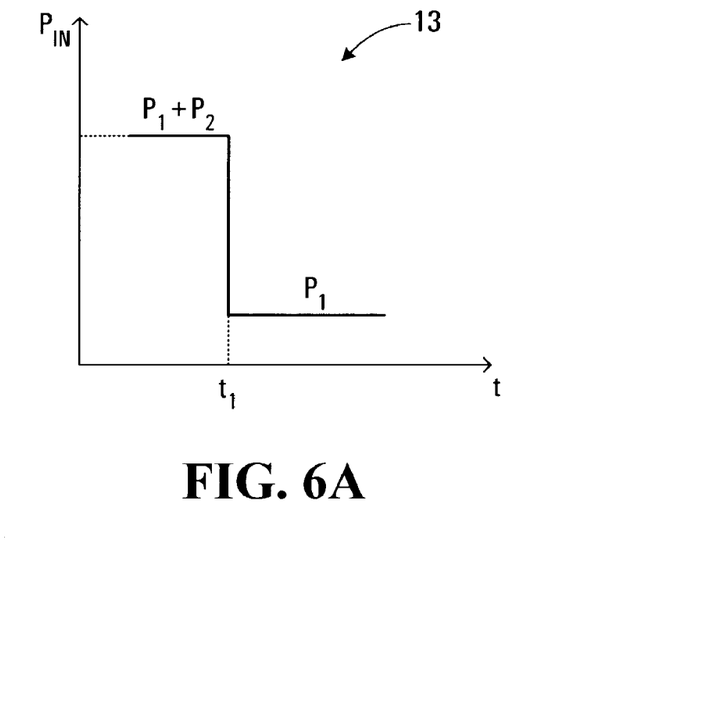
FIG. 6A is a Power vs. Time plot of a switching event in which a wavelength is dropped from a DWDM optical signal arriving at an input of the optical amplifier shown in FIG. 5.
Figure 6B:
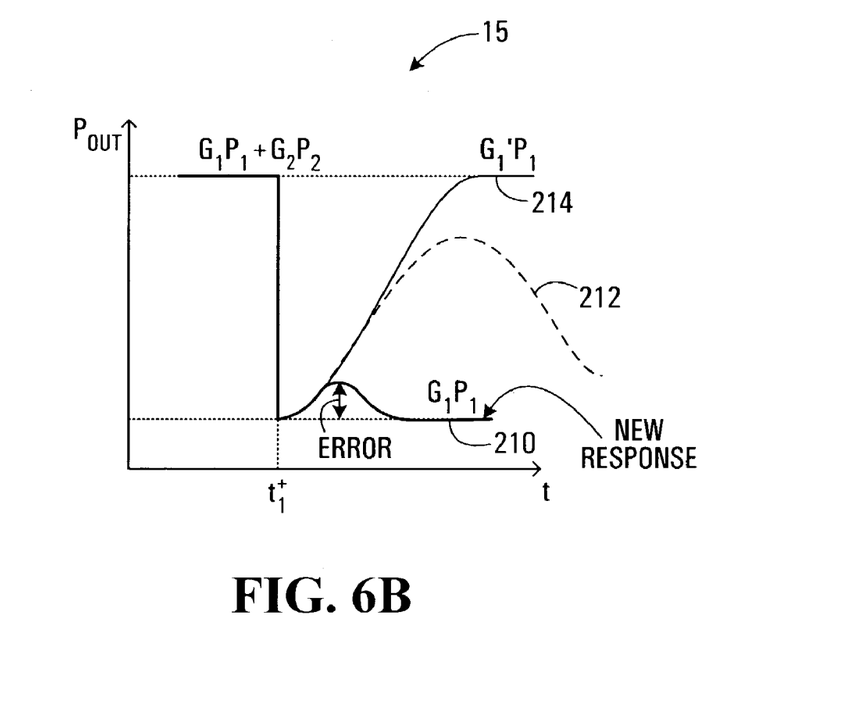
FIG. 6B is a Power vs. Time plot of a resulting transient response, induced by the switching event of FIG. 6A, in a corresponding output DWDM optical signal.

Shown in FIGS. 6A and 6B are respective input and output Power vs. Time plots, generally indicated by 13 and 15 respectively that together illustrate an example transient response of the EDFA 30 in combination with the AGC 40 shown in FIG. 5.

Similar to FIG. 1A, the initial total optical power of the DWDM optical signal shown in FIG. 6A is made up of the summation of optical powers $P_1$ and $P_2$ in respective wavelengths (not shown) $\lambda_1$ and $\lambda_2$. At a switching time (instant) $t_1$ wavelength $\lambda_2$ is dropped from the DWDM optical signal, and thus the total optical power of the DWDM optical signal abruptly drops from $(P_1+P_2)$ to $P_1$.

Shown in FIG. 6B is the Power vs. Time plot, generally indicated by 15, of the corresponding transient response, indicated generally by 210, in the corresponding DWDM optical signal outputted by the EDFA 30 in combination with the AGC 40. Before the switching time $t_1$ the total optical output power of the EDFA 30 is held steady at $(G_1P_1+G_2P_2)$. The terms $G_1$ and $G_2$ are the power gains provided by the EDFA 30 in combination with the AGC 40 to signals on respective wavelengths $\lambda_1$ and $\lambda_2$.

Immediately after the switching time $t_1$, at $t_1^+$, the optical output power outputted by the EDFA 30 correctly drops to $G_1P_1$ immediately after the switching event. If the pumps were maintained at a constant current the optical output power outputted by the EDFA 30 would increase back to its original level $G_1P_1$, as generally indicated by 214. The term $G_1'$ is the gain on wavelength $\lambda_1$ required to bring the optical power back to its level before the switching time $t_1$ (i.e. $G_1'P_1 \cong \_G_1P_1+G_2P_2$)

By contrast, when the AGC 40 provided by the present invention detects that the total gain is increasing it reacts quickly to adjust the pump current drive to the point where the correct total gain and average output power $P_a$ is maintained. It would be understood that the total gain is defined to be the ratio of total output power over total input power. As generally indicated by 210, the AGC 40 does adjust the pump currents quickly enough such that the temporary gain error experienced by the amplifier is substantially reduced in comparison with what could be done previously. In general after the output power error settles (after $t_1^+$) the total output power would be $G_1^*P_1$ (not shown) and not necessarily exactly $G_1P_1$. The term $G_1^*$ is defined in general by $((G_1^*P_1)/P_1 \cong (G_1P_1+G_2P_2)/(P_1+P_2))$ which allows for the cases where the EDFA 30 is not necessarily driven to provide a substantially flat gain spectrum.

Also shown in FIG. 6B, is the response of the prior art AGC, which is generally indicated by 212. Clearly, the prior art AGC simply is not able to react fast enough to mitigate the gain error induced on wavelength $\lambda_1$ before it reaches a dangerously high level. Consequently, the result is a temporary although substantial amplifier gain error which causes wavelength $\lambda_1$ to experience a significant power increase that can lead to bit errors or physical damage at the receiver.

Figure 7A:
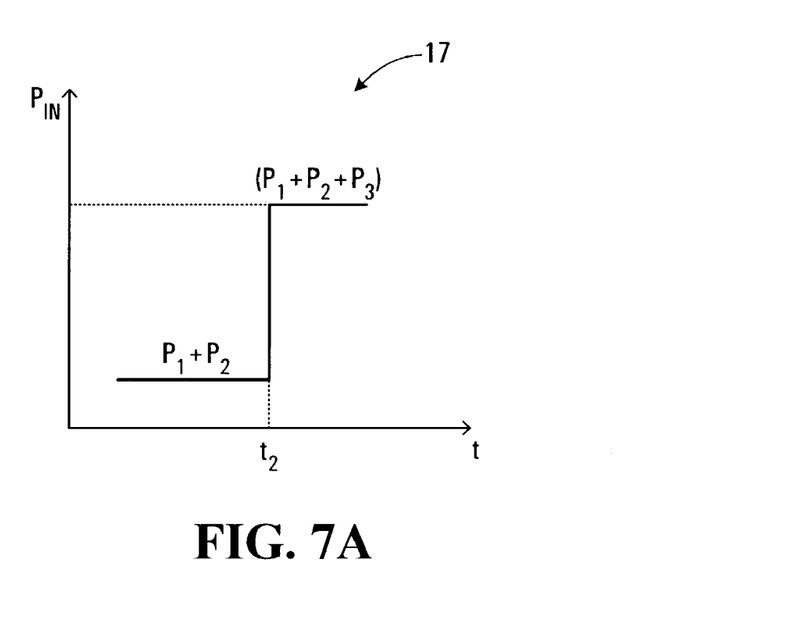
FIG. 7A is a Power vs. Time plot of a switching event in which a wavelength is added to a DWDM optical signal arriving at the input of the optical amplifier shown in FIG. 5.
Figure 7B:
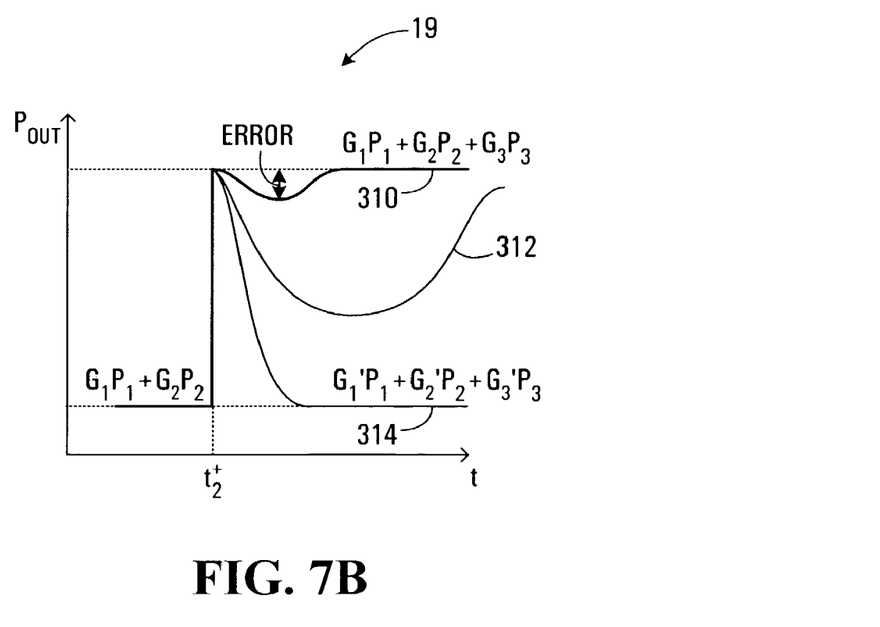
FIG. 7B is a Power vs. Time plot of a resulting transient response, induced by the switching event of FIG. 7A, in a corresponding output DWDM optical signal.

The AGC 40 performs equally as well when a wavelength is abruptly added to a DWDM optical signal. Shown in FIGS. 7A and 7B are respective input and output Power vs. Time plots of a DWDM optical signal inputted to and outputted from the EDFA 30 of FIG. 5, generally indicated by 17 and 19 respectively. They illustrate another example switching event in which a wavelength is added and its corresponding induced transient response in an outputted DWDM optical signal.

Referring to FIG. 7A (and similar to FIG. 2A), a DWDM optical signal (to be input to the optical amplifier and prior AGC introduced above) is initially made up of two wavelengths $\lambda_1$ and $\lambda_2$ having respective powers $P_1$ and $P_2$. At a switching instant $t_2$ a third wavelength $\lambda_3$ having a respective power $P_3$ is added to the input DWDM optical signal raising the total input optical power to the summation of $P_1$, $P_2$ and $P_3$.

With reference to FIG. 7B the initial (before the switching instant $t_2$) total optical output power is $(G_1P_1+G_2P_2)$ and immediately after the switching instant $t_2$, at $t_2^+$, the total optical output power outputted from the optical amplifier is correctly raised to $(G_1P_1+G_2P_2+G_3P_3)$ If the pumps were maintained at a constant current the optical output power outputted by the EDFA 30 would decrease back to its original level $(G_1'P_1+G_2'P_2+G_3'P_3)$, as generally indicated by 314. The terms $G_1'$ $G_2'$ and $G_3'$ are the gains on wavelengths $\lambda_1$, $\lambda_2$, and $\lambda_3$ required to bring the optical power back to its level before the switching time $t_2$ (i.e. $G_1'P_1+G_2'P_2+G_3'P_3 \cong G_1'P_1+G_2P_2$).

Again by contrast, when the AGC 40 provided by the present invention detects that the total gain is decreasing it reacts quickly to adjust the pump current drive to the point where the correct total gain and average output power $P_a$ is maintained. As generally indicated by 210, the AGC 40 can adjust the pump currents quickly enough such that the temporary gain error experienced by the amplifier is substantially reduced in comparison with what could be done previously. However, in general after the output power error settles (after $t_2^+$) the total output power would be $G_1^*P_1+G_2^*P_2+G_3^*P_3$ and not necessarily exactly $(G_1^*P_1+G_2P_2+G_3P_3)$. The terms $G_1^*$, $G_2^*$, and $G_3^*$ are defined in general by $(G_1P_1+G_2P_2)/(P_1+P_2) \cong (G_1^*P_1+G_2^*P_2+G_3^*P_3)/(P_1+P_2+P_3)$ which allows for the cases where the EDFA 30 is not necessarily driven to provide a substantially flat gain spectrum.

Also shown in FIG. 7B, is the response of the prior art AGC, which is generally indicated by 312. Clearly, the prior art AGC simply is not able to react fast enough to mitigate the drop in gain on wavelengths $\lambda_1$ and $\lambda_2$ before it reaches a much lower levels. Consequently, the result is a temporary although substantial amplifier gain error which causes wavelengths $\lambda_1$ and $\lambda_2$ to experience a significant power decreases that can lead to bit errors.

What has been described is merely illustrative of the application of the principles of the invention. Other arrangements and methods can be implemented by those skilled in the art without departing from the spirit and scope of the present invention.

For example, those skilled in the art would appreciate that the ACG 40 could be adapted to be a fast output power control that is not dependent on the input power by first removing the input power monitor 42 and dependent components from the AGC 40 shown in FIG. 5.

Alternatively, the EDFA could be replaced with another type of optical amplifier; such as a Fiber Amplifier (FA). Similarly, the PI controller could be replaced with another type of controller. Moreover, the tilted spectrum may be generated by use of a combination of a static gain shaping filter and design gain tilt properties of an optical amplifier and a Variable Optical Attenuator (VOA).

We claim:

1. An Automatic Gain Controller (AGC) for controlling a gain of an optical amplifier, the AGC comprising:
    a Proportional-Integral (PI) controller, having proportional and integral control coefficients $K_p$ and $K_i$ respectively, that are dynamically adjusted, the controller connectable to the optical amplifier to provide the optical amplifier with a bias condition that controls the gain provided by the optical amplifier;

an output power monitor connectable to the optical amplifier for taking at least one output power measurement from the optical amplifier; and a dynamic control block that dynamically adjusts at least one of the control coefficients in relation to the at least one power measurement.

2. The AGC of claim 1 in combination with said optical amplifier.

3. The AGC of claim 1 whereby the controller further controls the gain of the optical amplifier by taking into consideration an average output power measurement of the outputted power of the optical amplifier.

4. The AGC of claim 1, wherein the dynamic control block dynamically adjusts the proportional control coefficient $K_p$ in relation to the at least one output power measurement.

5. The AGC of claim 1, wherein the dynamic control block dynamically adjusts the integral control coefficient $K_i$ in relation to the at least one output power measurement.

6. The AGC of claim 1, wherein the dynamic control block dynamically adjusts both the proportional and integral control coefficients $K_p$ and $K_i$ in relation to the at least one output power measurement.

7. The AGC of claim 1, wherein the optical amplifier is Fiber Amplifier (FA).

8. The AGC of claim 1 further comprising:

an input power monitor connectable to the optical amplifier for taking at least one input power measurement from the optical amplifier;

a multiplier for combining the at least one input power measurement with a gain target to produce a target output power;

a subtractor for generating an error signal by taking a difference of the target output power and the at least one output power measurement; and wherein the difference is coupled into the controller.

9. The AGC of claim 1, wherein the dynamic control block adjusts $K_p$ according to $K_p = K_i \times \tau_p$, where $\tau_p$ is the time constant of a dominant pole in a transfer function of the PI controller.

10. The AGC of claim 1, wherein each time an output power measurement is taken the dynamic control block computes $K_p$.

11. The AGC of claim 1, wherein each time an output power measurement is taken the dynamic control block selects the values for $K_p$ from a look-up table.

12. The AGC of claim 1, wherein the bias condition provided by the PI controller is a pump driver voltage.

13. The AGC of claim 1, wherein the optical amplifier is an Erbium Doped Fiber Amplifier (EDFA).

14. The AGC of claim 2 further comprising a laser driver coupled between the optical amplifier and the PI controller.

15. The AGC of claim 2, wherein the optical amplifier is comprised of an Erbium Doped Fiber Amplifier (EDFA) and a laser driver, wherein the laser driver is connected to receive the bias condition and coverts the bias condition to an optical pump power that in tun drives the EDFA.

16. The AGC of claim 9, wherein $\tau_p$ is related to the at least one output power measurement by a function that approximates a characteristic response of the optical amplifier.

17. A method of controlling an optical amplifier comprising:

i) measuring input and output power levels with respective input and output power monitors to obtain at least one input power measurement and at least one output power measurement;

ii) multiplying the at least one input power measurement by a gain target to produce a target output power;

iii) subtracting the at least one output power measurement from the target output power to produce an error signal; and iv) applying the error signal to a Proportional-Integral (I) controller having a proportional coefficient $K_p$ that is continuously updated according to output power measurements such that $K_p$ is adjusted to substantially cancel a varying cut-off frequency of the optical amplifier, which in turn drives the optical amplifier.

18. The method according to claim 17, wherein the PI controller's proportional coefficient $K_p$ is updated according to $K_p = K_i \times \tau_p$, where $\tau_p$ is a time constant of a dominant pole in a transfer function of the PI controller and $K_i$ is an in control coefficient of the PI controller.

19. The method according to claim 17, wherein the optical amplifier is an Erbium Doped Fiber Amplifier (EDFA) that is nominally controlled by the AGC to provide an output signal with a tilted spectrum.

20. The method according to claim 17, wherein the optical amplifier is a Fiber Amplifier (FA) that is nominally controlled by the AGC to provide an output signal with a tilted spectrum to combat SRS-based transients.

21. The method according to claim 17, wherein the optical amplifier is an Erbium Doped Fiber Amplifier (EDFA) that is nominally controlled by the AGC to provide an output signal with a tilted spectrum to combat SRS-based transients.

22. The method according to claim 18, wherein $\tau_p$ is related to the at least one output power measurement by a function that approximates a characteristic response of the optical amplifier.

23. The method according the claim 20, wherein the tilted spectrum is generated by use of a combination of a static gain shaping filter and design gain tilt properties of the FA and a Variable Optical Attenuator (VOA).

24. The method according to claim 21, wherein the tilted spectrum is generated by use of a combination of a static gain shaping filter and design gain tilt properties of the EDFA and a Variable Optical Attenuator (VOA).

* * * * *